(12) United States Patent
Torgerson et al.

(10) Patent No.: US 7,707,966 B2
(45) Date of Patent: *May 4, 2010

(54) LINER CONTACT AUTOMATIC TEAT DIP APPLICATOR

(75) Inventors: Kevin L. Torgerson, Holmen, WI (US); Duane F. Sellner, Winona, MN (US)

(73) Assignee: GEA Farm Technologies, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/157,924

(22) Filed: Jun. 12, 2008

(65) Prior Publication Data

US 2009/0007849 A1    Jan. 8, 2009

Related U.S. Application Data

(63) Continuation of application No. 11/151,107, filed on Jun. 13, 2005, now Pat. No. 7,401,573.

(60) Provisional application No. 60/578,997, filed on Jun. 12, 2004.

(51) Int. Cl.
*A01J 7/04*    (2006.01)

(52) U.S. Cl. ................... 119/14.47; 119/670

(58) Field of Classification Search .............. 119/14.47, 119/670, 14.18, 14.55
See application file for complete search history.

(56) References Cited

U.S. PATENT DOCUMENTS

| | | | | |
|---|---|---|---|---|
| 2,532,088 A | * | 11/1950 | Cordis | 119/670 |
| 3,713,423 A | * | 1/1973 | Sparr, Sr. | 119/670 |
| 4,332,215 A | * | 6/1982 | Larson | 119/14.49 |
| 4,498,419 A | * | 2/1985 | Flocchini | 119/14.18 |
| 4,572,105 A | * | 2/1986 | Chowdhury et al. | 119/14.18 |
| 4,924,809 A | * | 5/1990 | Verbrugge | 119/14.02 |
| 5,673,650 A | * | 10/1997 | Mottram et al. | 119/651 |
| 5,850,845 A | * | 12/1998 | Pereira et al. | 137/239 |
| 6,098,570 A | * | 8/2000 | Aurik et al. | 119/604 |
| 6,234,110 B1 | * | 5/2001 | Xavier | 119/14.47 |
| 6,318,299 B1 | * | 11/2001 | Birk | 119/651 |
| 6,321,682 B1 | * | 11/2001 | Eriksson et al. | 119/14.44 |
| 6,435,132 B1 | * | 8/2002 | Milbrath et al. | 119/14.47 |
| 6,550,420 B1 | * | 4/2003 | Bjork | 119/14.47 |
| 6,591,784 B1 | | 7/2003 | Eriksson | |
| 6,755,153 B1 | * | 6/2004 | Chowdhury | 119/14.47 |

(Continued)

FOREIGN PATENT DOCUMENTS

EP    0 277 396 A1    8/1988

(Continued)

OTHER PUBLICATIONS

English language Abstract of WO 2005/043986 A1 for EP 1 679 956, European Patent Office esp@cenet database, 2pp.

(Continued)

*Primary Examiner*—Yvonne R. Abbott
(74) *Attorney, Agent, or Firm*—Smith Law Office

(57) ABSTRACT

A teat dip applicator and method direct a teat dip to a teat cup liner head that defines a chamber and nozzle through which teat dip flows to coat an animal teat prior to and during detachment of a milker unit from a dairy animal.

9 Claims, 8 Drawing Sheets

U.S. PATENT DOCUMENTS

| | | | |
|---|---|---|---|
| 6,935,270 B2 * | 8/2005 | Wipperfurth et al. | 119/14.02 |
| 6,997,136 B1 * | 2/2006 | Coates | 119/14.47 |
| 7,178,480 B2 * | 2/2007 | Dahl et al. | 119/14.47 |
| 7,281,493 B2 | 10/2007 | Dietrich | |
| 7,290,497 B2 | 11/2007 | Rottier et al. | |
| 2002/0185071 A1 * | 12/2002 | Guo | 119/14.47 |

FOREIGN PATENT DOCUMENTS

| | | |
|---|---|---|
| EP | 0 527 509 A2 | 2/1993 |
| EP | 0 801 893 A2 | 10/1997 |
| EP | 1 790 217 A2 | 5/2007 |
| EP | 1 795 069 A2 | 6/2007 |
| NL | 1016237 | 3/2002 |
| NL | 1021950 | 5/2004 |
| WO | WO 01/17337 A1 | 3/2001 |
| WO | WO 02/23976 A1 | 3/2002 |
| WO | WO 03/030630 A1 | 4/2003 |
| WO | WO 03/098998 A1 | 12/2003 |
| WO | WO 2005/043986 A1 | 5/2005 |
| WO | WO 2005/072516 A1 | 8/2005 |
| WO | WO 2005/102035 A2 | 11/2005 |
| WO | WO 2007/129884 A1 | 11/2007 |
| WO | WO 2007/129888 A1 | 11/2007 |

OTHER PUBLICATIONS

English language Abstract of WO 2005/102035 A2 for EP 1 737 291, European Patent Office esp@cenet database, 1p.
English language Abstract for NL 1021950, European Patent Office's esp@cenet.com database, 1p.
English language Translation of NL1016237, 18pp.
Form PCT/ISA/210, International Search Report dated Oct. 11, 2006, 5 pp.
Written Opinion of the International Search Authority dated Oct. 11, 2006, 5pp.
Thompson, et al., The End-Of-Milking Sequence and its Mechanization, 1976 Winter Mtg., Dec. 14-17, 1976, Animal Physiology and Genetics Institute, Beltsville, MD, 15pp.
Grindal et al., Automatic application of teat disinfectant through the milking machine cluster, Journal of Dairy Research, 56:579-585 (1989), 7pp.
Shearn, et al., "Reduction of bacterial contamination of teatcup liners by an entrained wash system," Institute for Animal Health, Veterinary Record (1994) 134, 450, 1p.
3-A® Accepted Practices for Permanently Installed Product and Solution Pipelines and Cleaning Systems Used in Milk and Milk Product Processing Plants, No. 605-04, 9pp.
Akam, D.N., The Development of Equip. for the Mechanization of Manual Operations in Machine . . . , 17th Ann'l Mtg. Nat'l Mastitis Counsel, Inc., pp. 417-426, Feb. 21-23, 1978.

* cited by examiner

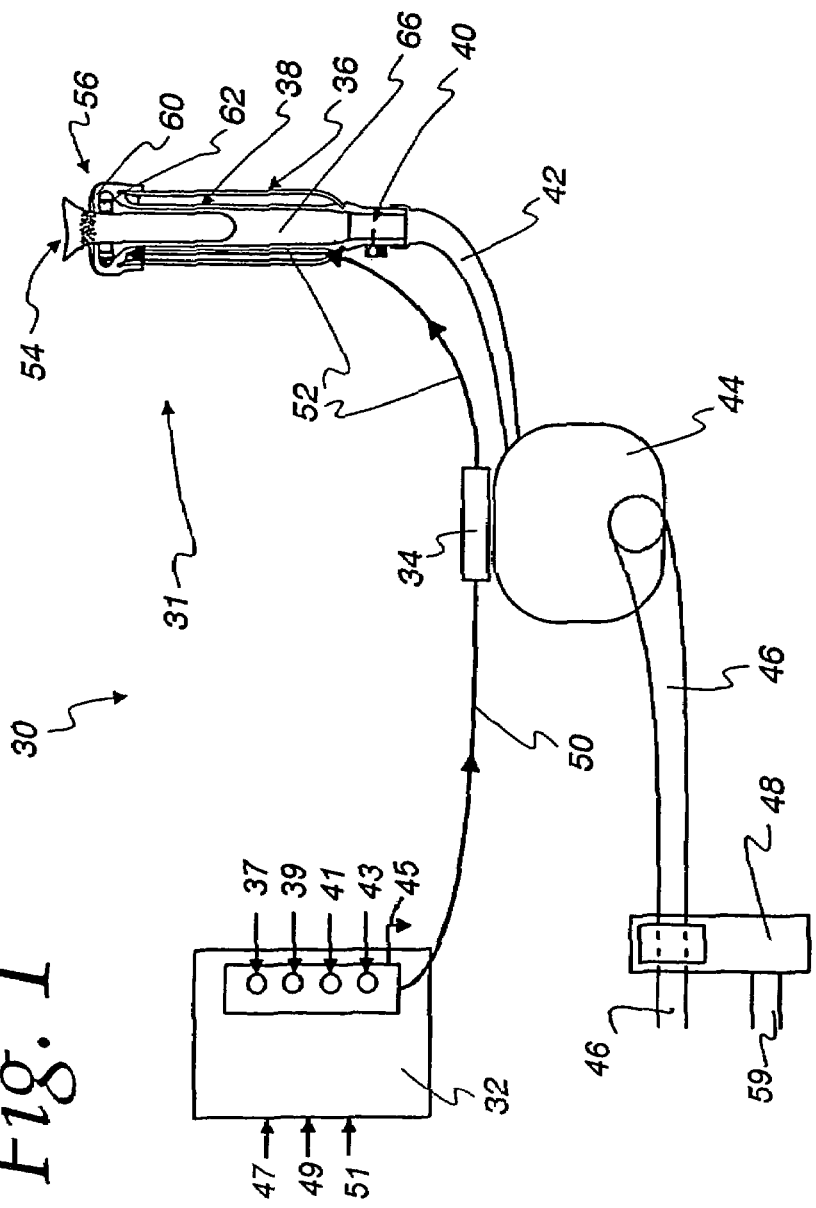

US 7,707,966 B2

LINER CONTACT AUTOMATIC TEAT DIP APPLICATOR

This application is a continuation of application Ser. No. 11/151,107 filed Jun. 13, 2005 which is a continuation of Provisional Application No. 60/578,997 filed Jun. 12, 2004, the disclosures of which are incorporated herein by reference.

BACKGROUND OF THE INVENTION

This invention relates generally to teat dips for dairy animals and more particularly to methods and apparatus for applying teat dip to dairy animal teats and udders after milking and before detachment from a milker unit.

After milking, a dairy animal's teats can be protected with a post-milking dip ("post-dip") that protects the teats from infection. The post-dip is typically applied by an operator by dipping a liquid, spraying a liquid or applying a foam. This process is performed each time the animals are milked, and is generally useful in reducing the incidence of mastitis.

One approach to simplifying this procedure is to apply the post-dip before the milker unit is detached as disclosed in WO 02/23976 A1, which is incorporated herein by reference. Nonetheless, with such a system there may only be limited coverage of the teat. Therefore, there is a need for apparatus and methods for applying post-dip to a dairy animal's teats and udder in an efficient manner.

SUMMARY OF THE INVENTION

Apparatus in accordance with the present invention include a liner contact automatic teat dip applicator for delivering a ring of post-dip to the top of a dairy animal's teat at the end of milking and before milker unit detachment. Teat post-dip is delivered to a chamber space inside a milking cup liner head between a liner barrel and liner mouth piece opening. The dip enters a liner head chamber space and exits openings in the liner head to apply a ring of dip around the teat.

As the milker unit is detached and the teat cup shell is pulled from the teat, a ring of dip is wiped down the length of the teat by the liner mouth piece to apply a film of dip covering all sides of the teat and leaving a pool of dip at the end of the teat to protect the teat opening. This is an efficient way to ensure proper coating of a teat.

Before the milker unit is applied to another animal, the teat cup must be rinsed of all dip to avoid contaminating milk. This is preferably done by isolating the teat dip applicator from the milk line and rinsing so that rinsing liquid and teat dip are prevented from entering the milk line.

Valves and hoses for dip are preferably bunched with vacuum and milk lines that service the milker unit. A manifold can be used to direct dip from a controller to a number of different dip applicators in the milking parlor. A dip conduit from the manifold feeds dip to the liner dome. The dip conduit is disposed either along the outside of a teat cup shell or through a teat cup shell base and upward along an inside of the shell.

The dip conduit can be a hose that connects to a nozzle to direct dip into the liner head chamber. Preferably, the nozzle has a relatively small diameter opening to limit the amount of milk that might enter the nozzle and dip hose. Alternatively, a check valve could be used to prevent milk from entering the nozzle, hose, and teat dip manifold.

Dip is applied when the milking cycle has ended for each individual animal. An end-of-milking signal indicating that milker unit detachment is about to occur prompts delivery of the dips either automatically or by an operator. Similarly, shortly after dip is applied and the milker unit is detached, rinsing and backflushing of the teat cup will commence automatically. The present invention can be used alone or in combination with a system as described in WO 02/23976 A1.

BRIEF DESCRIPTION OF THE DRAWINGS

FIG. 1 is a schematic of a teat dip application apparatus in accordance with the present invention;

FIG. 2 is a schematic elevational view of an animal's teat covered with dip applied by the apparatus and methods of the present invention;

DESCRIPTION OF THE PREFERRED EMBODIMENTS

Figure 3:
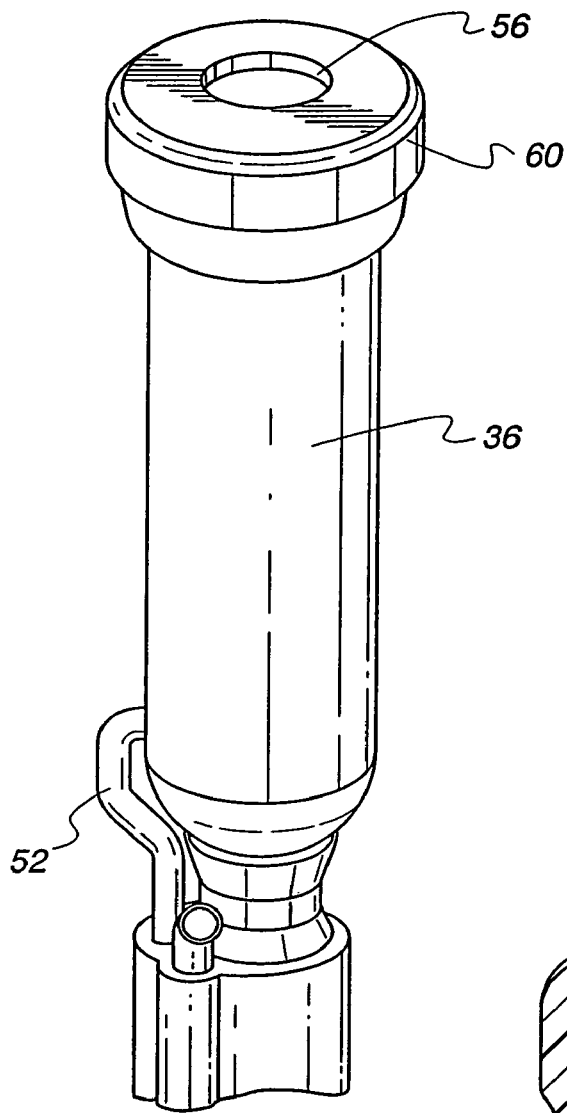
FIG. 3 is a perspective view of a teat cup, inflation, and a teat dip applicator in accordance with the present invention.

FIG. 1 illustrates a teat dip application system 30 in accordance with the present invention. The teat dip application system 30 includes an applicator 31 that applies dip to a cow or other dairy animal teat. The applicator 31 includes a control panel 32 and a dip manifold 34. A teat cup shell 36, a liner 38, a first backflush valve 40, a short milk tube 42, a milker unit 44, milk line 46, and an optional second backflush valve 48 are also provided to work as part of or in conjunction with the applicator 31.

The control panel 32 remotely controls operation of the teat dip application system 30. It can be automated with suitable manual overrides or it can be operated by manually engaging various control buttons in response to audible and/or visual signals reflecting the stage of a milking and backflush operation.

The control panel 32 controls the flow of air 37, water 39, teat dip 41, and any appropriate three-way valve ventilation that may be necessary. A vent 45 is also provided. The control panel 32 can remotely control valves elsewhere within the system 30 or it can incorporate valves and hose connections for controlling air, water, teat dip, and valve ventilation.

The control panel 32 is in fluid communication with the dip manifold 34 via a manifold hose 50. The dip manifold 34 is illustrated as feeding a single teat dip applicator and milker unit combination, but the manifold 34 preferably serves a number of liners 38 and milker unit combinations. The dip manifold 34 is in fluid communication with each teat dip liner 38 via a dip hose 52.

The dip hose 52 preferably tracks along the short milk tube 42, the first backflush valve 40, and passes into the teat cup shell 36 where it is protected from damage. Alternatively, the dip hose 52 could travel an alternate route to the teat cup shell 36. The dip hose 52 can also be routed on the exterior of the teat cup shell 36, or be part of an integral duct (not illustrated) formed in the teat cup shell 36. The dip hose 52 forms part of a fluid conduit through which teat dips, air, and water pass.

The liner 38 is disposed in the teat cup shell 36 and serves the same general function of any cup liner, which is to provide a pulsation necessary to extract milk from the teat 54. The liner 38 includes a mouth 56, a liner sleeve 58, a liner head 60, a liner head chamber 62, at least one liner head opening 64, and a barrel 66 that extends downward through the teat cup shell 36. The liner mouth 56 is sized to receive the teat 54 in the usual manner.

The liner head 60 defines the liner chamber 62 and the liner head opening 64. Preferably, there are a plurality of line head openings 64. There is also preferably included a nozzle 65 (FIGS. 10 through 13) of a reduced diameter to limit the possibility of milk entering the dip hose 52. Alternatively, a check valve could be used to seal the dip hose 52 from milk.

The line head 60 and liner head chamber 62 are also part of the teat dip applicator 31 because with this configuration, air 47, water 49, and teat dip 51 are fed from a source and through the control panel 32, the manifold hose 50, the dip manifold 34, the dip hose 52, and into the liner head chamber 62. Once in the liner head chamber 62, the teat dip 51 is directed onto the teat 54 by the liner head opening 64 to apply a ring of dip around the upper portion of the teat 54. As the shell 36 is detached from the teat 54, it is preferred that the flow of teat dip 51 continue or that there be a sufficient amount of dip 51 already applied to the teat so that the liner head 60 wipes dip down the teat 54 toward the lower end to leave at least a majority of the teat 54 covered in dip. As the dip 51 flows down the teat 54, it will desirably leave an excess amount to protect the teat sphincter at the lower end of the teat from bacteria and other substances. (See FIG. 2.) The amount of dip 51 applied will vary depending on the type and strength of dip 51 being applied, but the control panel 32 can be adjusted to accommodate any amount of dip 51 desired.

Once a sufficient amount of dip is applied, the dip manifold 34 shuts off the flow of dip. Dip cannot be left inside the liner 38 because it may contaminate milk from the next cow. Backflushing of the liner 38 is therefore desirable. There are at least two options to backflush the liner 38. In one option, the second backflush valve 48 is opened to deliver a backflushing fluid 59 such as water or a suitable chemical into the milk line 46, through the milker unit 44, the short milk tube 42, the first backflush valve 40 (if present), and out of the liner 38. In a second option, the first backflushing valve 40 is used, and only the liner 38 is backflushed while the milk line 46 is isolated by the backflushing valve 40.

Automatic operation of the system 30 relies on an end-of-milking signal from a milk sensor (not illustrated) that activates the control panel 32 to shut off vacuum to the milker unit 44. The first backflush valve 40 is then closed to isolate the liner head nozzle 64 from the milker line 46 to protect the milk line 46 from being exposed to dip and backflushing fluid 59.

The control panel 32 then operates a three-way valve to connect the control panel 32 to the manifold hose 50 and delivers dip into the manifold hose 50, manifold 34, dip hose 52, liner head chamber 62, and liner head opening 64. The amount and pressure of the dip 51 is controlled by the valves and the pressure of the source of dip.

Air is then forced through the manifold hose 50, manifold 52, dip hose 52, and liner head chamber 62 to force dip out of the liner head opening 64. As the milker unit 44 then begins detachment via a standard detacher mechanism (not illustrated), the liner head 60 mouth wipes dip down the teat sides and deposits an excess dip amount on the teat end.

Next, normal backflush cycles are used as described above to sanitize the liner between milkings and rinse out any teat dip residue. The system 30 is now ready to repeat the cycle.

The amount of dip varies depending on formulation, but is typically less than 2 milliliters (ml.) of dip per teat. Air pressure should be as low as possible to force dip through the applicator, and yet minimize forcing dip deep into the liner 38 or out the top of the liner 38. A small residual amount of vacuum from the milking process may be used to draw dip through the applicator.

The backflushing cycle helps reduce bacteria transfer between animals milked by the same milker unit. The backflushing cycle preferably includes a chemical cycle that exposes the liner to germicides for a sufficient time and then a rise cycle to remove the germicide, solids, and any other chemical residue. The rinse cycle is followed by a purge cycle that removes any excess rinse water.

FIG. 3 depicts a teat cup shell 36, a liner head 60, and a dip hose 52. The dip hose 52 continues upward through the shell 36 to connect with the liner head chamber 62, as described above.

Figure 4:
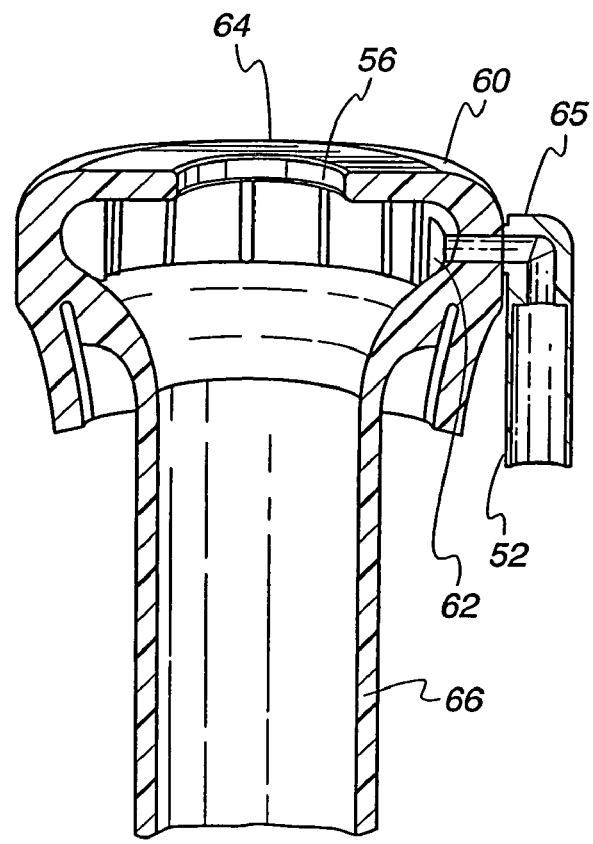
FIG. 4 is a partial cross-sectional view of a teat dip applicator in accordance with the present invention.
Figure 5:
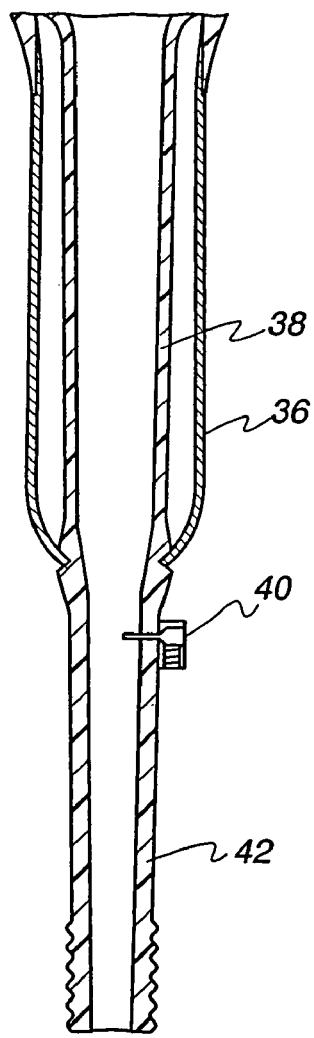
FIG. 5 is a partial cross-sectional view of a teat dip applicator flushing nozzle and short milk tube in accordance with the present invention.
Figure 6:
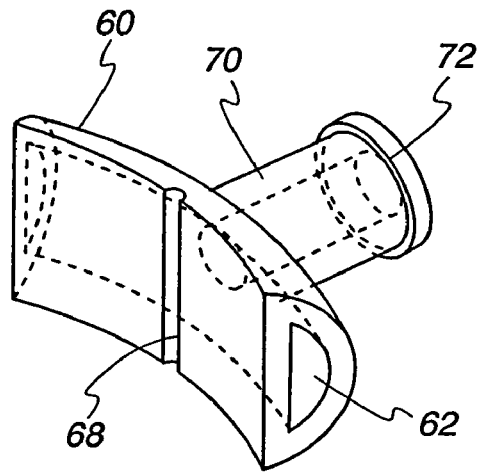
FIG. 6 is a partial perspective view of a teat dip applicator ring in accordance with the present invention.
Figure 7:
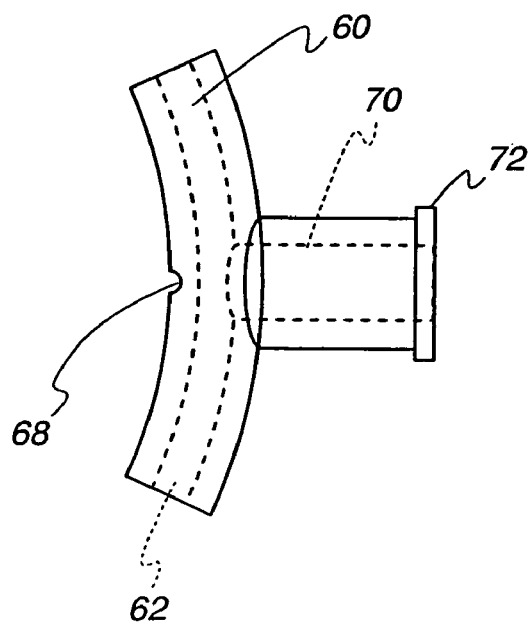
FIG. 7 is a partial plan view of a teat dip applicator ring in accordance with the present invention.
Figure 8:
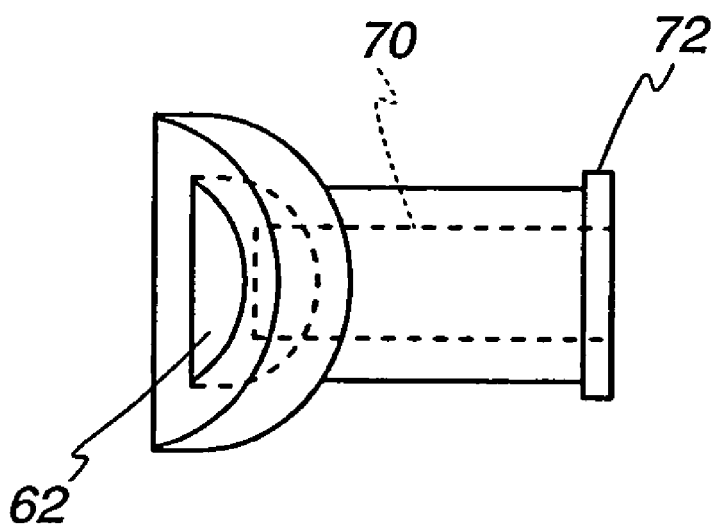
FIG. 8 is a partial cross-sectional view of an teat dip applicator ring in accordance with the present invention.
Figure 9:
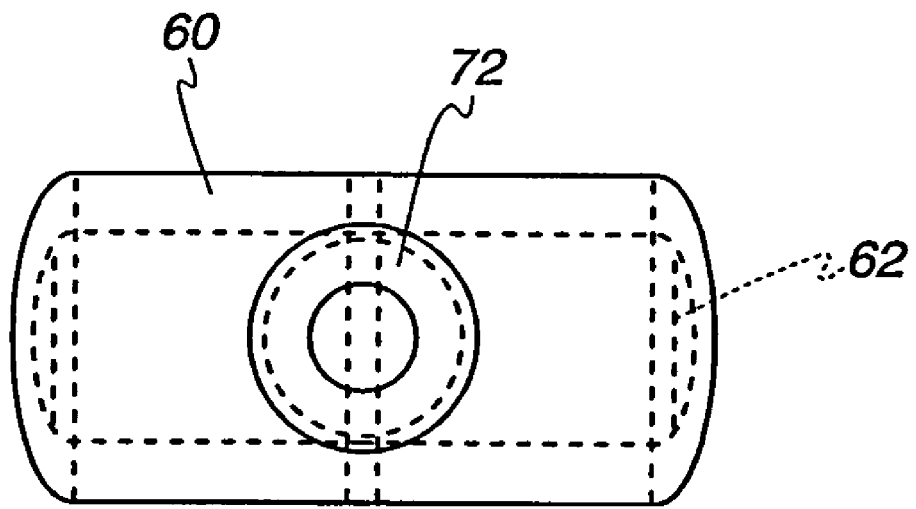
FIG. 9 is a partial side view of a teat dip applicator ring in accordance with the present invention.
Figure 10:
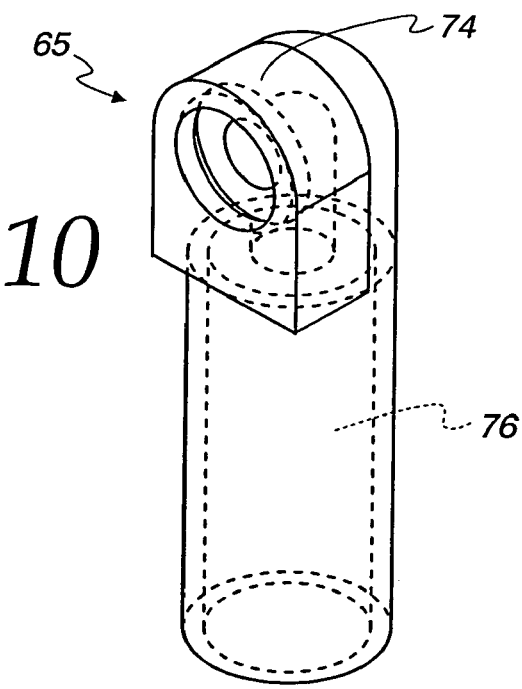
FIG. 10 is a partial perspective view of a flush nozzle for use with a teat dip applicator in accordance with the present invention.
Figure 11:
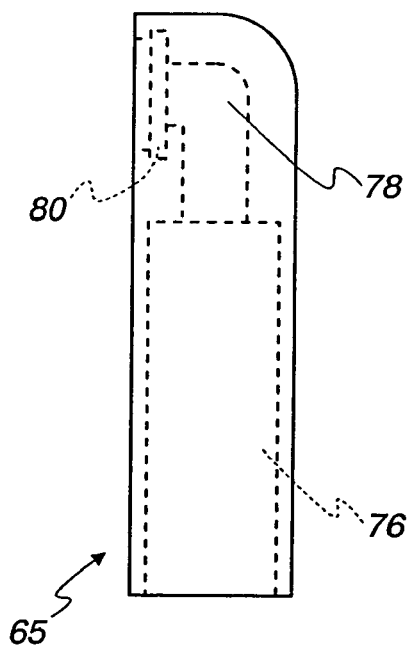
FIG. 11 is a partial side cross-sectional view of the flush nozzle of FIG. 10.
Figure 12:
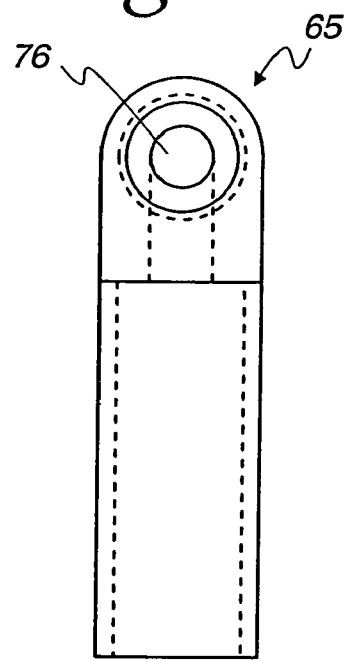
FIG. 12 is a partial side cross-sectional view of the flush nozzle of FIG. 10.
Figure 13:
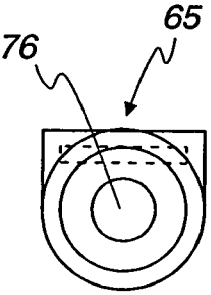
FIG. 13 is a partial top cross-sectional view of the flush nozzle of FIG. 10.
Figure 14:
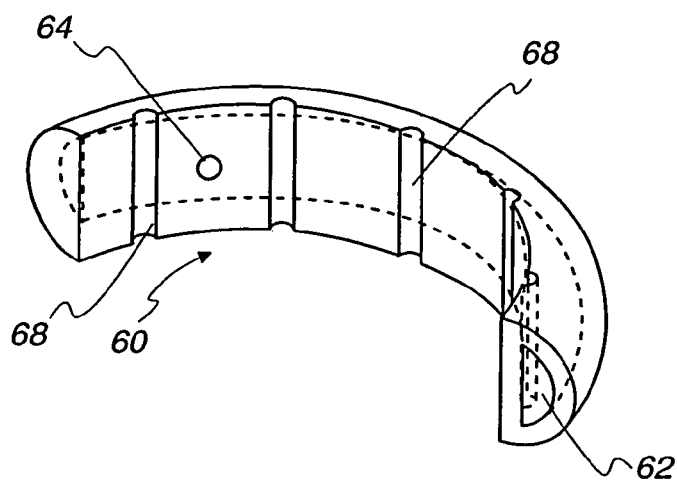
FIG. 14 is a partial perspective view of a teat dip applicator ring in accordance with the present invention.

FIG. 4 depicts a cross-section of a dip hose 52 feeding a liner head chamber 62 within a liner head 60. The liner head 60 includes at least two liner head openings 64 through which dip is applied. The inner surface of the liner head 60, includes a number of kerfs 68 to add flexibility to the liner head 60. FIG. 5 illustrates a teat cup shell 36, a liner 38, and a first backflushing valve 40.

FIGS. 6, 7, 8, and 9 illustrate a segment of one embodiment of a liner head 60 in accordance with the present invention. The liner head 60 includes a chamber 62, and a nipple 70 for connecting to a dip hose (not illustrated in these figures). The liner head 60 also includes a kerf 68 opposite the nipple 70 to provide flexibility. At the end of the nipple 70 there is provided an annular ring 72 that is preferably formed integrally with the nipple 70, and is used to mate with a nozzle 65 or directly to the dip hose 52.

A suitable nozzle 65 at the end of the dip hose 52 is illustrated in FIGS. 10, 11, 12, and 13. The nozzle 65 includes an internal bore 76 of a relatively large diameter and an internal elbow 78 of a relatively small diameter to limit the amount of milk that enters the dip hose 52. Alternatively, a check valve could be used to seal off the dip hose 52. At the downstream end of the elbow 78, there is an annular recess 80 sized and positioned to mate with the annular ring 72 on the liner head nipple 72. This is a preferred means providing a releasable and secure connection between the nozzle 65 and the liner head 60.

Figure 15:
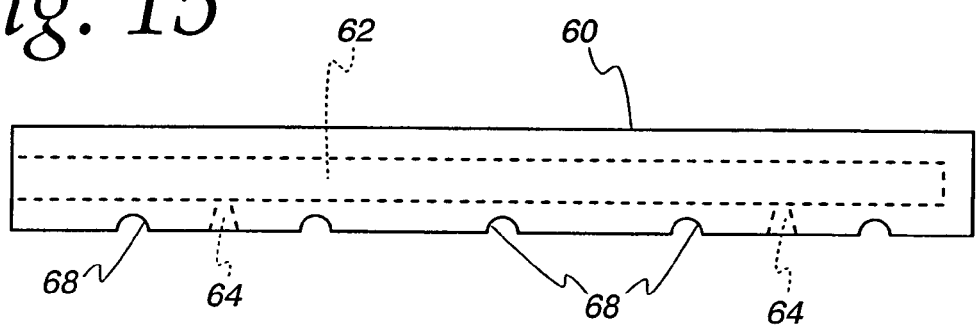
FIG. 15 is a partial top view of the teat dip applicator ring of FIG. 14.
Figure 16:
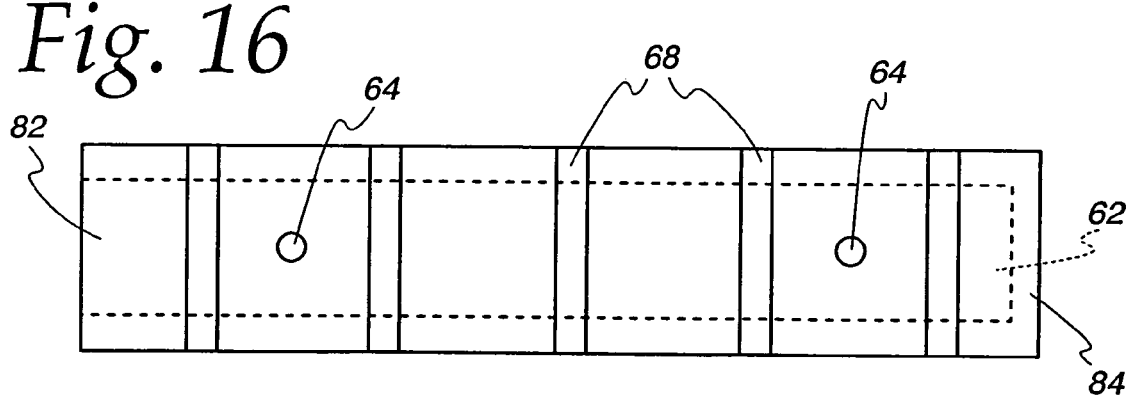
FIG. 16 is a partial side view of the teat dip applicator ring of FIG. 15.
Figure 17:
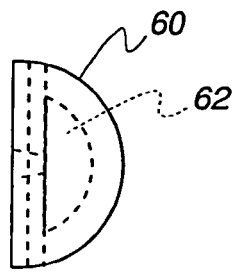
FIG. 17 is a partial cross-sectional side view of the teat dip applicator ring of FIG. 15.
Figure 18:
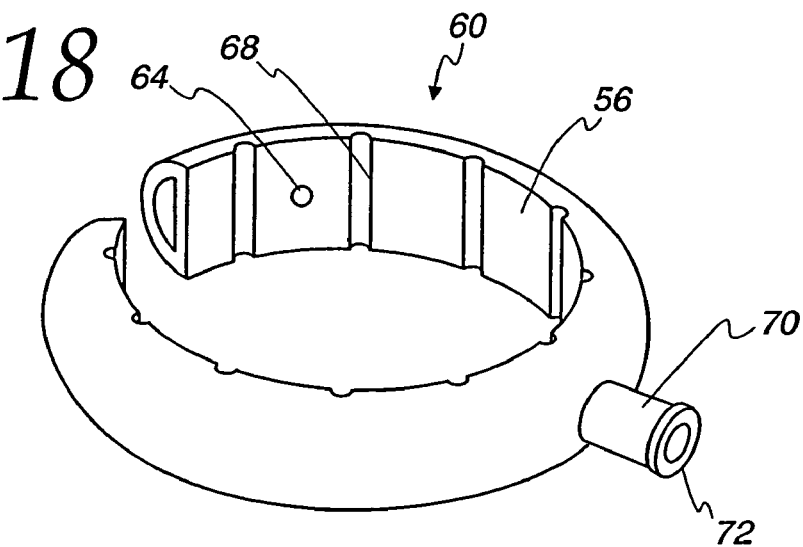
FIG. 18 is a partial perspective view of a teat dip applicator ring in accordance with the present invention.
Figure 19:
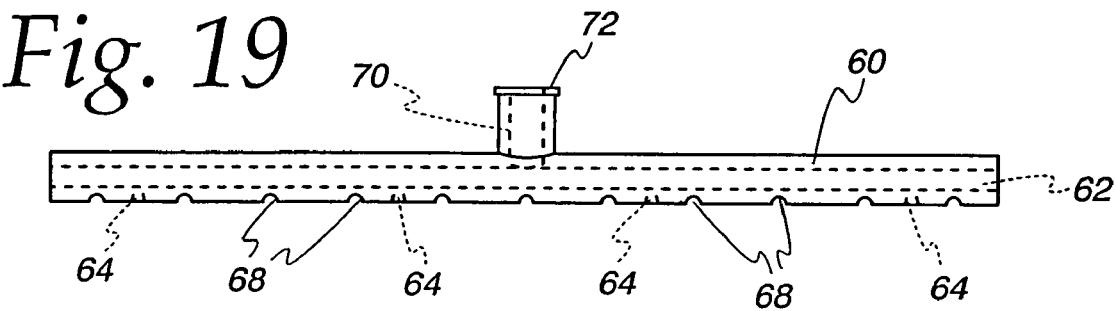
FIG. 19 is a top view of the teat dip applicator ring of FIG. 18.
Figure 20:
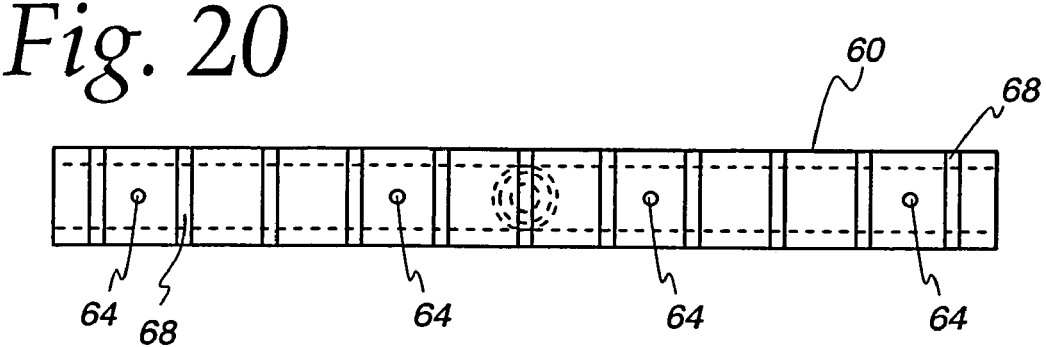
FIG. 20 is a side view of the inner circumference of the teat dip applicator ring of FIG. 18.
Figure 21:
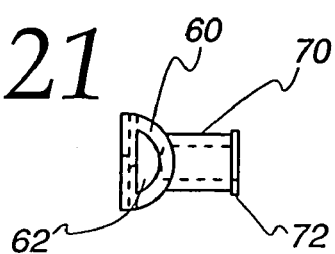
FIG. 21 is a partial cross-sectional view of the teat dip applicator ring of FIG. 18.
Figure 22:
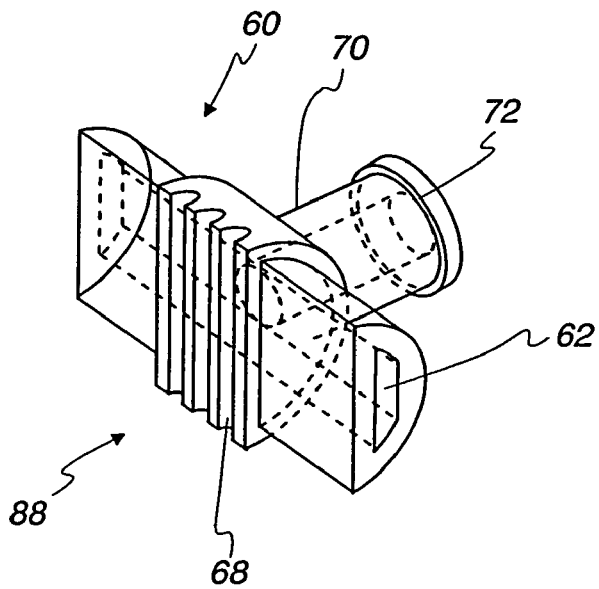
FIG. 22 is a partial perspective view of a teat dip applicator ring in accordance with the present invention.
Figure 23:
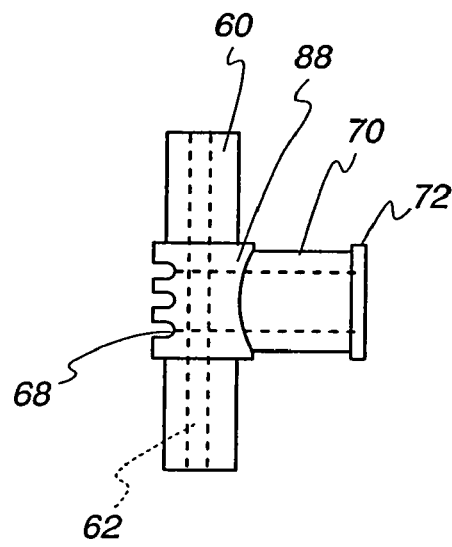
FIG. 23 is a partial top view of the teat dip applicator ring of FIG. 22.
Figure 24:
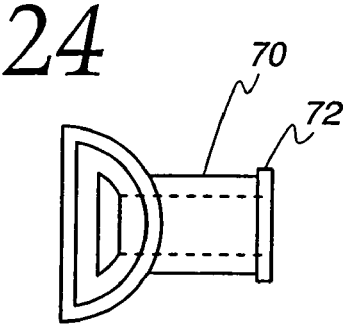
FIG. 24 is a partial side view of the inner circumference of the teat dip applicator ring of FIG. 22.
Figure 25:
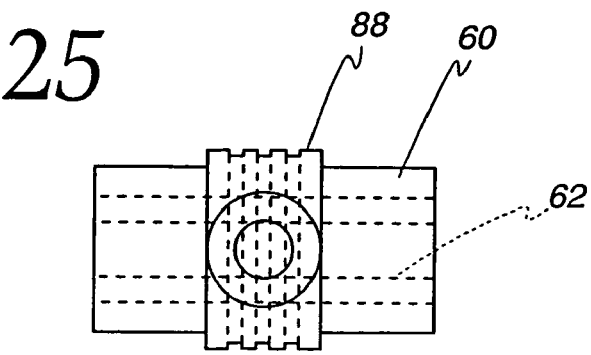
FIG. 25 is a partial side cross-sectional view of the teat dip applicator ring of FIG. 22.

FIGS. 14, 15, 16, and 17 illustrate a larger segment of a liner head 60 with FIGS. 15 and 16 illustrating a liner head segment 60 extended (or flattened) out for illustration purposes. The liner head 60 could be manufactured this way as well. The liner head 60 includes a liner head chamber 62 that has an open end 82 and a terminal end 84. The liner head chamber 62 feeds at least two liner head openings 64 to provide adequate coverage of the teat with dip. Kerfs 68 are provided as well. In this manner, the liner head 60 can be manufactured and attached to a liner 38 or the liner head 60 can be formed integrally with the liner 38.

FIGS. 18, 19, 20, and 21 illustrate another alternate liner head 60 segment defining a liner head chamber 62 that is continuous around the liner head 60. This liner head segment 60 includes four liner head openings 64, a nipple 70, and an annular ring 72 for mating with a dip hose 52. A number of kerfs 68 are formed in the inner surface of the liner head 60 to provide flexibility.

FIGS. 22, 23, 24, and 25 illustrate another alternate embodiment of a liner head 60 that includes a liner head chamber 62 and a nipple 70. A reinforced portion 88 is provided in the area adjacent the nipple 70. The reinforced portion 88 also includes a number of alternate kerfs 90 to provide flexibility of the liner head 60 in the reinforced section.

The foregoing detailed description is provided for clearness of understanding only and no unnecessary limitations therefrom should be read into the following claims.

The invention claimed is:

1. A teat dip applicator comprising:
   a teat dip conduit; and
   a flexible liner for a milker unit teat cup having a liner head that defines a teat opening and a substantially annular-shaped liner head chamber, that is in fluid communication with the teat dip conduit, the liner head further defining an opening through which teat dip from the liner head chamber can flow and be applied to an upper portion of an animal teat.

2. The teat dip applicator of claim 1, and further comprising:
   a controller for controlling the flow of teat dip through the teat dip conduit.

3. The teat dip applicator of claim 2, and further comprising:
   a manifold for directing teat dip to the teat dip conduit.

4. The teat dip applicator of claim 1, and further comprising:
   a backflush valve to prevent the flow of backflushing fluid into a milk line.

5. The teat dip applicator of claim 1, wherein the liner head defines a plurality of spaced apart openings through which fluid from the liner head chamber can flow.

6. The teat dip applicator of claim 1, wherein the liner head includes an inner annular surface defining a kerf.

7. The teat dip applicator of claim 1, and further comprising a controller for dispensing teat dip through the teat dip conduit and the liner head chamber opening simultaneously with detachment of the liner from an animal teat.

8. The teat dip applicator of claim 1, wherein the liner head is adapted to be in wiping engagement with an animal teat.

9. A teat dip applicator comprising:
   a teat dip conduit;
   a liner for a milker unit teat cup having a liner head defining an annular liner head chamber that is in fluid communication with the teat dip conduit, the liner head further defining an opening through which fluid from the liner head chamber can flow and be applied to an upper portion of an animal teat; and
   a nozzle to restrict milk from flowing into the teat dip conduit.

\* \* \* \* \*